United States Patent
Gautier et al.

(10) Patent No.: US 7,460,718 B2
(45) Date of Patent: Dec. 2, 2008

(54) CONVERSION DEVICE FOR PERFORMING A RASTER SCAN CONVERSION BETWEEN A JPEG DECODER AND AN IMAGE MEMORY

(75) Inventors: Antoine Gautier, Segny (FR); Mahesh Chandra, Delhi (IN)

(73) Assignees: STMicroelectronics SA, Montrouge (FR); STMicroelectronics Pvt. Ltd., Uttar Pradesh (IN)

( * ) Notice: Subject to any disclaimer, the term of this patent is extended or adjusted under 35 U.S.C. 154(b) by 632 days.

(21) Appl. No.: 11/155,391

(22) Filed: Jun. 17, 2005

(65) Prior Publication Data

US 2006/0072840 A1    Apr. 6, 2006

(30) Foreign Application Priority Data

Jun. 18, 2004    (EP)    ................... 04291550

(51) Int. Cl.
    *G06K 9/36* (2006.01)
(52) U.S. Cl. .................................... 382/232
(58) Field of Classification Search ............. 382/260, 382/276, 298, 299; 348/441, 450, 453; 375/240
    See application file for complete search history.

(56) References Cited

U.S. PATENT DOCUMENTS

| | | | |
|---|---|---|---|
| 5,982,443 A | 11/1999 | Chung | 348/441 |
| 6,091,778 A | 7/2000 | Sporer et al. | 375/240 |
| 6,229,571 B1 | 5/2001 | Sato | 348/446 |
| 7,269,295 B2 * | 9/2007 | Keshet et al. | 382/260 |
| 2001/0017658 A1 | 8/2001 | Kuroiwa | 348/273 |

FOREIGN PATENT DOCUMENTS

EP    0 456 394    4/1991

\* cited by examiner

*Primary Examiner*—Jose L Couso
(74) *Attorney, Agent, or Firm*—Lisa K. Jorgenson; Allen, Dyer, Doppelt, Milbrath & Gilchrist

(57) ABSTRACT

The conversion device includes an input for receiving data corresponding to an image to be displayed. The received data is in a JPEG decoder output data format. A processor is included for reconstructing and writing the image to be displayed into the image memory, in a display module expected input data format. The bandwidth of the image memory is greater than one byte. The processor is fully hardwired and includes a first logic stage for writing the received data byte by byte into an intermediate memory at chosen addresses such that the written data form a sequence of data in the display module expected input data format, and a second logic stage for reading the written data in the intermediate memory, forming successive packets of read data having a size corresponding to the bandwidth, and successively writing the packets into the image memory at chosen addresses such that the written packets together form all the lines of the image.

21 Claims, 15 Drawing Sheets

FIG.10

First macroblock Y

| Line number | Count [2,1,0] | Count [5,4,3] | Count [6] | Count [7] | Count [8] | WrAddress [8,7,6,5,4,3,2,1,0] |
|---|---|---|---|---|---|---|
| 1 | 0<br>1<br>2<br>3<br>4<br>5<br>6<br>7 | 0 | 0 | 0 | 0 | 0<br>2<br>4<br>6<br>8<br>10<br>12<br>14 |
| 2 | 0<br>1<br>2<br>3<br>4<br>5<br>6<br>7 | 1 | 0 | 0 | 0 | 0 + 32<br>2 + 32<br>4 + 32<br>6 + 32<br>8 + 32<br>10 + 32<br>12 + 32<br>14 + 32 |
| 3 | 0<br>1<br>2<br>3<br>4<br>5<br>6<br>7 | 2 | 0 | 0 | 0 | 0 + 32x2<br>2 + 32x2<br>4 + 32x2<br>6 + 32x2<br>8 + 32x2<br>10 + 32x2<br>12 + 32x2<br>14 + 32x2 |
| 4 | ⋮ | 3 | 0 | 0 | 0 | ⋮ |
| 5 | ⋮ | 4 | 0 | 0 | 0 | ⋮ |
| 6 | ⋮ | 5 | 0 | 0 | 0 | ⋮ |
| 7 | ⋮ | 6 | 0 | 0 | 0 | ⋮ |
| 8 | 0<br>1<br>2<br>3<br>4<br>5<br>6<br>7 | 7 | 0 | 0 | 0 | 0 + 32x7<br>2 + 32x7<br>4 + 32x7<br>6 + 32x7<br>8 + 32x7<br>10 + 32x7<br>12 + 32x7<br>14 + 32x7 |

FIG.11

Second macroblock Y

| Line number | Count [2,1,0] | Count [5,4,3] | Count [6] | Count [7] | Count [8] | WrAddress [8,7,6,5,4,3,2,1,0] |
|---|---|---|---|---|---|---|
| 1 | 0<br>1<br>2<br>3<br>4<br>5<br>6<br>7 | 0 | 0 | 0 | 0 | 0 + 16<br>2 + 16<br>4 + 16<br>6 + 16<br>8 + 16<br>10 + 16<br>12 + 16<br>14 + 16 |
| 2 | 0<br>1<br>2<br>3<br>4<br>5<br>6<br>7 | 1 | 0 | 0 | 0 | 0 + 32 + 16<br>2 + 32 + 16<br>4 + 32 + 16<br>6 + 32 + 16<br>8 + 32 + 16<br>10 + 32 + 16<br>12 + 32 + 16<br>14 + 32 + 16 |
| 3 | 0<br>1<br>2<br>3<br>4<br>5<br>6<br>7 | 2 | 0 | 0 | 0 | 0 + 32x2 + 16<br>2 + 32x2 + 16<br>4 + 32x2 + 16<br>6 + 32x2 + 16<br>8 + 32x2 + 16<br>10 + 32x2 + 16<br>12 + 32x2 + 16<br>14 + 32x2 + 16 |
| 4 |  | 3 | 0 | 0 | 0 |  |
| 5 |  | 4 | 0 | 0 | 0 |  |
| 6 |  | 5 | 0 | 0 | 0 |  |
| 7 |  | 6 | 0 | 0 | 0 |  |
| 8 | 0<br>1<br>2<br>3<br>4<br>5<br>6<br>7 | 7 | 0 | 0 | 0 | 0 + 32x7 + 16<br>2 + 32x7 + 16<br>4 + 32x7 + 16<br>6 + 32x7 + 16<br>8 + 32x7 + 16<br>10 + 32x7 + 16<br>12 + 32x7 + 16<br>14 + 32x7 + 16 |

FIG.12

Macroblock Cr

| Line number | Count [2,1,0] | Count [5,4,3] | Count [6] | Count [7] | Count [8] | WrAddress [8,7,6,5,4,3,2,1,0] |
|---|---|---|---|---|---|---|
| 1 | 0<br>1<br>2<br>3<br>4<br>5<br>6<br>7 | 0 | 0 | 0 | 0 | 0 + 1<br>2 + 1<br>4 + 1<br>6 + 1<br>8 + 1<br>10 + 1<br>12 + 1<br>14 + 1 |
| 2 | 0<br>1<br>2<br>3<br>4<br>5<br>6<br>7 | 1 | 0 | 0 | 0 | 0 + 1 + 32<br>2 + 1 + 32<br>4 + 1 + 32<br>6 + 1 + 32<br>8 + 1 + 32<br>10 + 1 + 32<br>12 + 1 + 32<br>14 + 1 + 32 |
| 3 | 0<br>1<br>2<br>3<br>4<br>5<br>6<br>7 | 2 | 0 | 0 | 0 | 0 + 1 + 32x2<br>2 + 1 + 32x2<br>4 + 1 + 32x2<br>6 + 1 + 32x2<br>8 + 1 + 32x2<br>10 + 1 + 32x2<br>12 + 1 + 32x2<br>14 + 1 + 32x2 |
| 4 | | 3 | 0 | 0 | 0 | |
| 5 | | 4 | 0 | 0 | 0 | |
| 6 | | 5 | 0 | 0 | 0 | |
| 7 | | 6 | 0 | 0 | 0 | |
| 8 | 0<br>1<br>2<br>3<br>4<br>5<br>6<br>7 | 7 | 0 | 0 | 0 | 0 + 1 + 32x7<br>2 + 1 + 32x7<br>4 + 1 + 32x7<br>6 + 1 + 32x7<br>8 + 1 + 32x7<br>10 + 1 + 32x7<br>12 + 1 + 32x7<br>14 + 1 + 32x7 |

FIG.13

Macroblock Cb

| Line number | Count [2,1,0] | Count [5,4,3] | Count [6] | Count [7] | Count [8] | WrAddress [8,7,6,5,4,3,2,1,0] |
|---|---|---|---|---|---|---|
| 1 | 0<br>1<br>2<br>3<br>4<br>5<br>6<br>7 | 0 | 0 | 0 | 0 | 0 + 3<br>2 + 3<br>4 + 3<br>6 + 3<br>8 + 3<br>10 + 3<br>12 + 3<br>14 + 3 |
| 2 | 0<br>1<br>2<br>3<br>4<br>5<br>6<br>7 | 1 | 0 | 0 | 0 | 0 + 3 + 32<br>2 + 3 + 32<br>4 + 3 + 32<br>6 + 3 + 32<br>8 + 3 + 32<br>10 + 3 + 32<br>12 + 3 + 32<br>14 + 3 + 32 |
| 3 | 0<br>1<br>2<br>3<br>4<br>5<br>6<br>7 | 2 | 0 | 0 | 0 | 0 + 3 + 32x2<br>2 + 3 + 32x2<br>4 + 3 + 32x2<br>6 + 3 + 32x2<br>8 + 3 + 32x2<br>10 + 3 + 32x2<br>12 + 3 + 32x2<br>14 + 3 + 32x2 |
| 4 | ⋮ | 3 | 0 | 0 | 0 | ⋮ |
| 5 | ⋮ | 4 | 0 | 0 | 0 | ⋮ |
| 6 | ⋮ | 5 | 0 | 0 | 0 | ⋮ |
| 7 | ⋮ | 6 | 0 | 0 | 0 | ⋮ |
| 8 | 0<br>1<br>2<br>3<br>4<br>5<br>6<br>7 | 7 | 0 | 0 | 0 | 0 + 3 + 32x7<br>2 + 3 + 32x7<br>4 + 3 + 32x7<br>6 + 3 + 32x7<br>8 + 3 + 32x7<br>10 + 3 + 32x7<br>12 + 3 + 32x7<br>14 + 3 + 32x7 |

CONVERSION DEVICE FOR PERFORMING A RASTER SCAN CONVERSION BETWEEN A JPEG DECODER AND AN IMAGE MEMORY

FIELD OF THE INVENTION

The present invention relates to image processing, especially JPEG decoding, and in particular to a raster scan conversion between a JPEG decoder and an image memory, for example, for Digital Still Cameras (DSC).

BACKGROUND OF THE INVENTION

A JPEG decoder is responsible for reading encoded data and converting the data into interleaved 8×8 macroblocks of the color components (i.e. luminance Y and chrominance Cr, Cb). More precisely, when an image to be displayed is decoded by the JPEG decoder, the JPEG decoder will first generate two macroblocks of luminance Y, then one macroblock of chrominance Cb and then one macroblock of chrominance Cr.

Unfortunately, these macroblocks cannot be used directly by the display functionality. Indeed, the display functionality is expecting a raster scan format, i.e. Y data for first pixel followed by Cr for adjacent pixel, and then Y of second pixel followed by Cb of first and second pixels (there is only one Cb and one Cr for two Y bytes). It is thus necessary to perform a raster scan conversion between the JPEG decoder and the display module.

The conventional approach for performing such a conversion is a fully software technique. More precisely, the JPEG decoded data are written directly into the memory. And, in a second step, the central processing unit will reorder these decoded images in a suitable image format for the display module. However, such an approach is time consuming and can generate real time issues for the central processing unit.

SUMMARY OF THE INVENTION

Objects of the invention include: addressing the above described problem; saving the CPU time and speeding up the raster scan conversion; and increasing the memory access efficiency and reaching the maximum theoretical data bandwidth of a memory whatever the data bus size.

The invention provides a conversion device for performing a raster scan conversion between a JPEG decoder and an image memory. The conversion device comprises an input for receiving data corresponding to an image to be displayed, the data being in a JPEG decoder output data format. The conversion device also comprises a processor for reconstructing and rewriting the image to be displayed into the image memory, in a display module expected input data format.

According to a general feature of the invention, the bandwidth of the image memory is greater than one byte, the processor is fully hardwired. Further, the processor comprises a first logic stage for writing the received data byte by byte into an intermediate memory at chosen addresses such that the written data form a sequence of data in the display module expected input data format.

The processor also comprises a second logic stage for reading the written data in the intermediate memory, forming successive packets of read data, the packets having a size corresponding to the bandwidth, and successively writing the packets into the image memory at chosen addresses such that the written packets form together all the lines of the image.

Thus, the approach of the invention is fully hardwired and no software is required. Consequently, the CPU time is saved and the raster scan conversion is sped up due to hardware acceleration. Further, memory access efficiency is increased as, according to the invention, the whole memory data bus is used. In other words, whatever the data bus size, the maximum theoretical data bandwidth is reached.

According to an embodiment of the invention, the received data comprises successive groups of a predetermined size, for example each group comprises 4 macroblocks of 256 bytes each. And, the intermediate memory comprises two intermediate buffers adapted for respectively storing two consecutive groups. The first logic stage is adapted for writing a current group alternatively into one buffer while the second logic stage is adapted to read alternatively the another buffer. In other words, the intermediate memory, for example a 512 bytes fifo is implemented for 4 macroblocks in a ping pong buffer.

According to an embodiment of the invention, the received data comprises successive groups of four macroblocks, each macroblock having 8 lines of 8 bytes, each group corresponding to at least a part of 8 lines of an image to be displayed and comprising two 8×8 bytes luminance macroblocks followed by two 8×8 bytes chrominance macroblocks. The data written in the intermediate memory and corresponding to the four macroblocks of one group form a raster block having 8 lines. Each line of the raster block comprises a first sequence including the 8 bytes of the corresponding line of the first luminance macroblock interleaved with the 8 bytes of the corresponding line of one chrominance macroblock (for example Cr or Cb), followed by a second sequence including the 8 bytes of the corresponding line of the second luminance macroblock interleaved with the 8 bytes of the corresponding line of the other chrominance macroblock (for example Cb or Cr). And all the consecutive bytes of each consecutive line of the raster block are written at consecutive addresses of the intermediate memory. The first logic stage comprises advantageously a 9-bit write counter clocked byte by byte and delivering a write control word of 9 bits, and logic write address generator controlled by the successive values of the write control word.

According to an embodiment of the invention, the first three bits of the write control word are representative of the byte order inside a line of a macroblock; the three following bits of the write control word are representative of the line order inside one macroblock; the $8^{th}$ bit distinguishes, within a group of four macroblocks, a pair of luminance macroblocks from a pair of chrominance macroblocks; the $7^{th}$ bit distinguishes one macroblock inside a pair of macroblocks, and the last bit of the write control word distinguishes one intermediate buffer from the other one.

According to an embodiment of the invention, the second logic stage comprises a reader for reading byte by byte the written data in the intermediate memory at consecutive addresses, and n auxiliary buffers connected to the output of the intermediate memory for storing n consecutive read bytes and forming the corresponding packet having a size corresponding the bandwidth. When the image memory has a bandwidth of 16 bits, n is equal to 2. If the bandwidth is equal to 32 bits, n is equal to 4.

According to an embodiment of the invention, the reader comprises a 9-bit read counter clocked byte by byte and delivering a read control word. And each value of the read control word represents a read address for said intermediate memory.

According to an embodiment of the invention, the second logic stage comprises a memory address pointer controlled by a hardwired controller comprising a first counter associated to the bytes of a line of a raster block, a second counter associated to lines of a raster blocks, a third counter associated to the raster blocks of an horizontal part of the image (i.e. associated to the horizontal size of the image), and a fourth counter associated to the size of the image. All the counters are clocked byte by byte, and the memory address pointer is incremented by a number of bytes, for example two, corresponding to the bandwidth each time the difference between a current value and the preceding value of the counter is equal to the number, for example two.

The invention also provides a Digital Still Camera including a conversion device as defined above.

BRIEF DESCRIPTION OF THE DRAWINGS

Other advantages and features of the invention will appear on examining the detailed description of embodiments, these being in no way limiting and of the appended drawings in which:

FIGS. 10-13 are tables illustrating an example of writing address generated by the first logic stage of a device according to the invention;

DETAILED DESCRIPTION OF THE PREFERRED EMBODIMENTS

Figure 1:
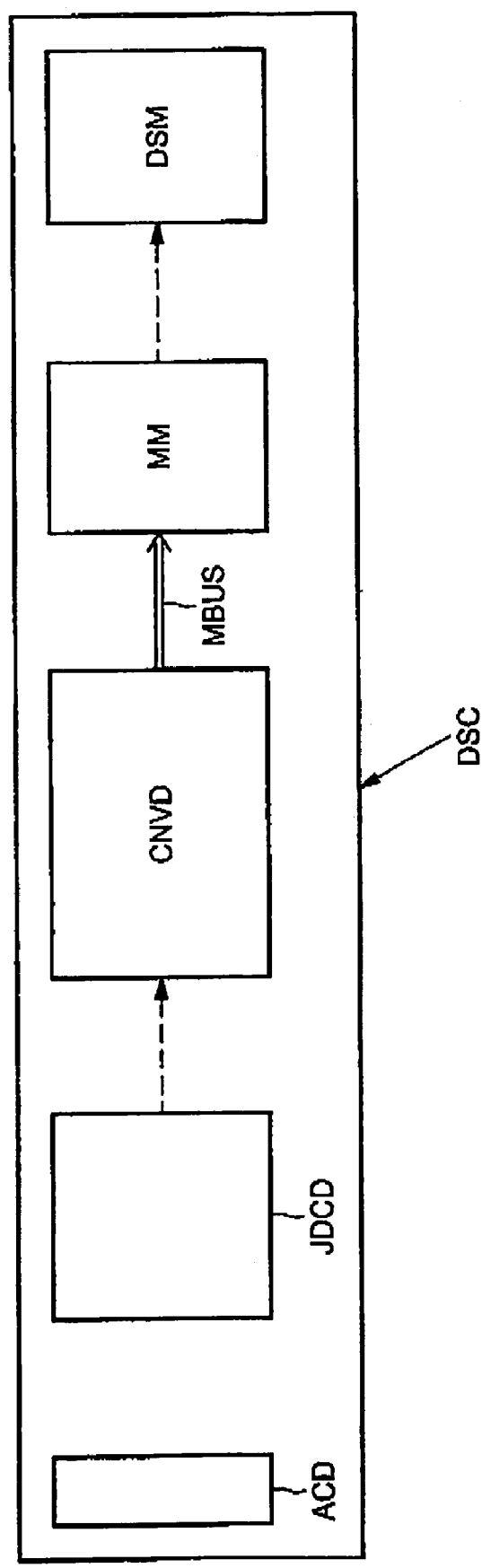
FIG. 1 is a schematic block diagram illustrating a Digital Still Camera according to the invention including a conversion device according to the invention.

In FIG. 1, DSC designates a Digital Still Camera including an optical acquisition device ACD. A conventional JPEG decoder JDCD is responsible for reading encoded data in a memory (not represented in this figure) and converting the data into interleaved 8×8 macroblocks of the color components. A conversion device according to the invention CNVD is connected between the output of the JPEG decoder JDCD and an image memory MM and is adapted for performing a raster scan conversion between the JPEG decoder and the image memory MM which is adapted to contain the reconstructed final image to be displayed on a display module DSM.

Figure 2:
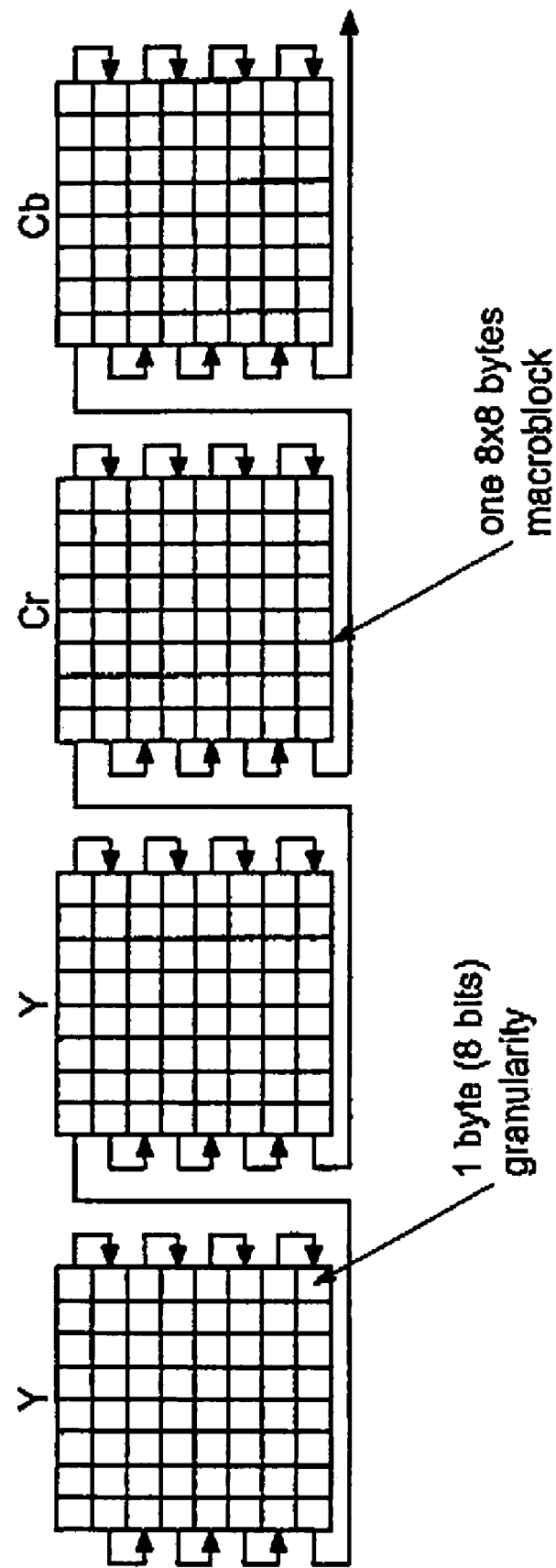
FIG. 2 is a schematic diagram illustrating a JPEG decoder output data format.

Further, the image memory MM is connected to the output of the conversion device CNVD by a memory data bus MBUS which has a size, for example 16 bits, corresponding to the bandwidth of the image memory (i.e. the number of bits which can be written simultaneously in the image memory). As illustrated in FIG. 2, the JPEG decoder first generated two macroblocks of luminance Y, then one macroblock of chrominance Cr and then one macroblock of chrominance Cb. These 4 8×8 bytes macroblocks form together a group of 256 bytes. And, the JPEG decoder generates successive groups of 256 bytes.

Figure 3:
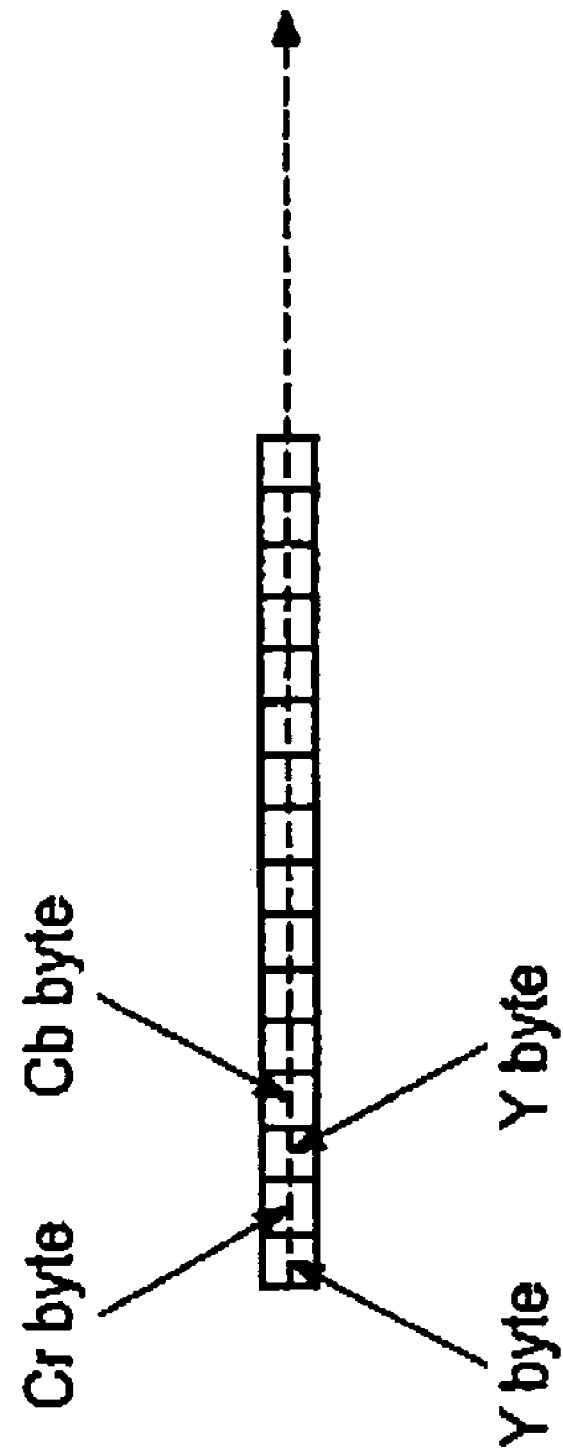
FIG. 3 is a schematic diagram illustrating a display module expected input data format.

However, the JPEG decoder output data format, illustrated in FIG. 2, is different from the display module expected input data format illustrated in FIG. 3. More precisely, the display module is expecting a raster scan format, i.e. a Y byte followed by a Cr byte followed by a second Y byte followed by a Cb byte. In some applications, the Cr and Cb bytes can be swapped.

The data delivered by the JPEG decoder is received byte by byte at the input of the conversion device CNVD and will be written into an intermediate memory, in the present case into a 512 bytes fifo (2×4×8×8) comprising in the present case two intermediate buffers having each a size of 256 bytes (4×8×8). The received bytes will be written in the intermediate memory at chosen addresses such that the written data form a sequence of data in the display module expected input data format.

More precisely, as explained above, the receive data comprises successive groups of 4 macroblocks, each macroblock having 8 lines of 8 bytes. Each group corresponds to at least a part of 8 lines of an image to be displayed and comprises two 8×8 bytes luminance macroblocks Y, Y, followed by two 8×8 bytes chrominance macroblocks Cr, Cb.

Figure 7:
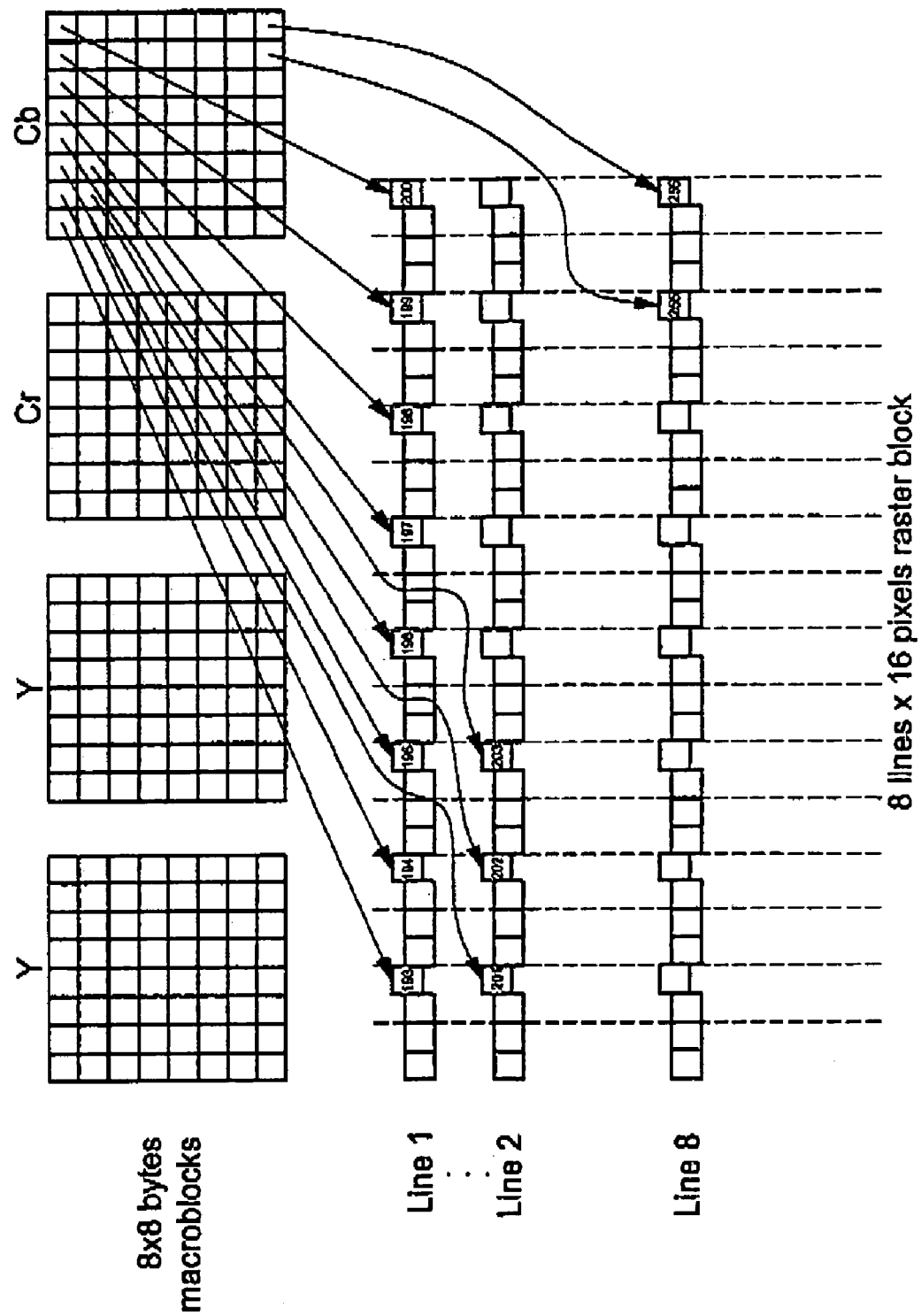

As illustrated in FIG. 7, the data written in the intermediate memory and corresponding to the 4 macroblocks of one group form a raster block RB having 8 lines. Each line of the raster block comprises a first sequence including the 8 bytes of the corresponding line of the first luminance macroblock Y interleaved with the 8 bytes of the corresponding line of one chrominance macroblock, for example the chrominance macroblock Cr. This first sequence is followed by a second sequence including the 8 bytes of the corresponding line of the second luminance macroblock Y interleaved with the 8 bytes of the corresponding line of the other chrominance macroblocks, for example the chrominance macroblock Cb.

Figure 4:
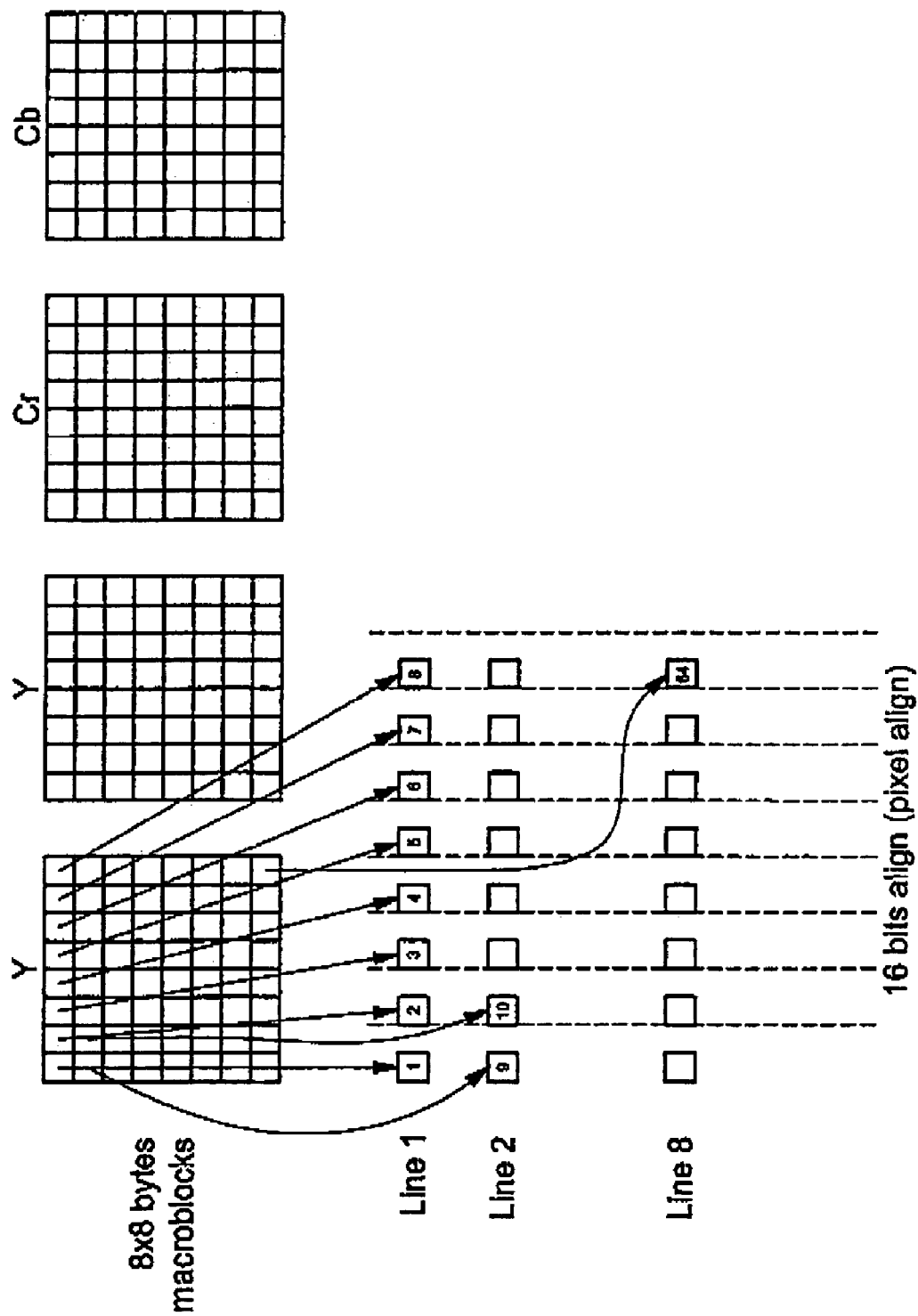
FIGS. 4-7 are schematic diagrams illustrating a format conversion performed according to the invention.

In FIGS. 4-7, a subdivision in pixels of 16 bits is represented. As illustrated in FIGS. 4-7, all the consecutive bytes of each consecutive line of the raster block are written at consecutive addresses of the intermediate memory. More precisely, the 64 bytes of the first Y macroblock are first written in the intermediate memory as illustrated in FIG. 4.

Figure 5:
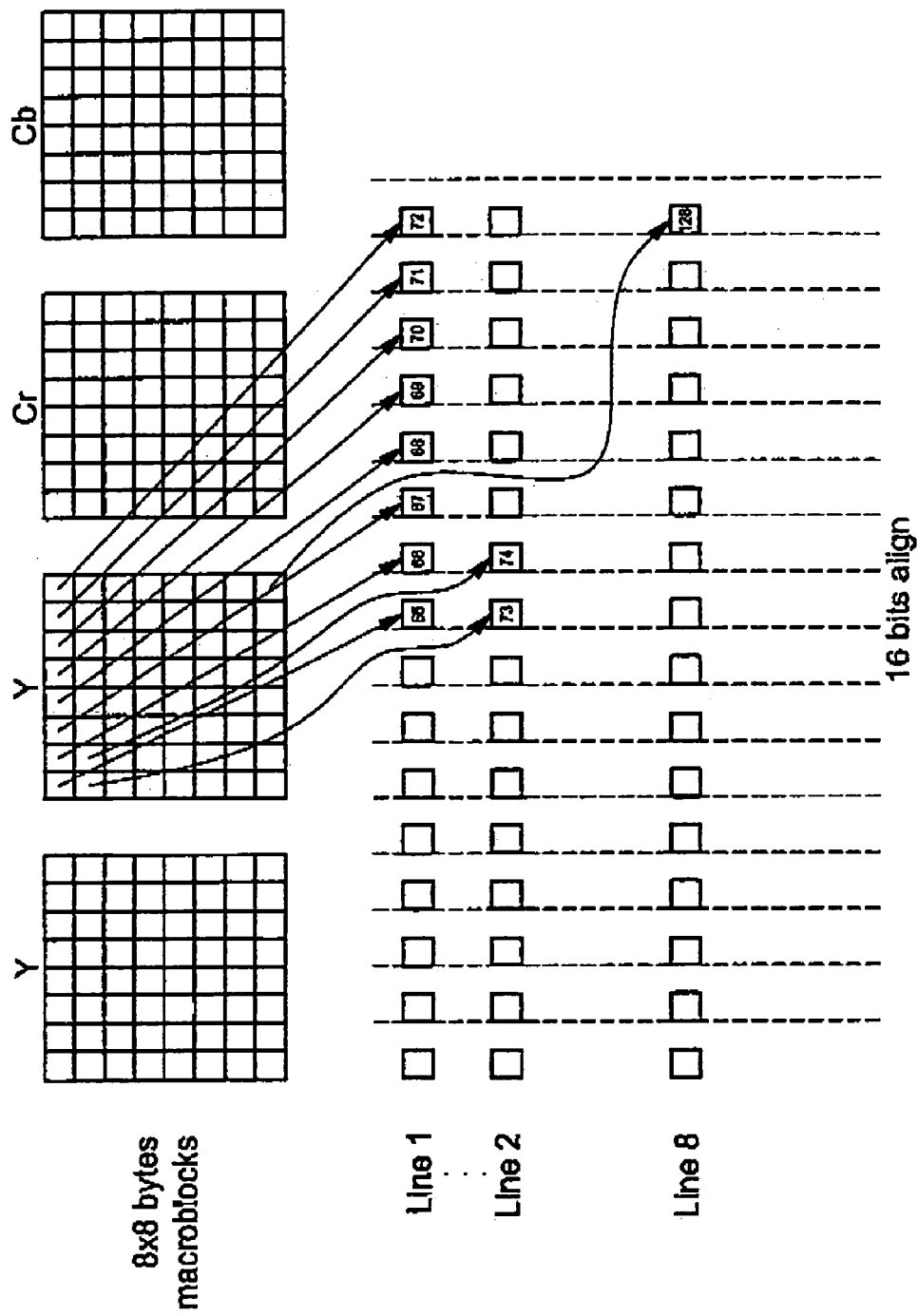
Figure 6:
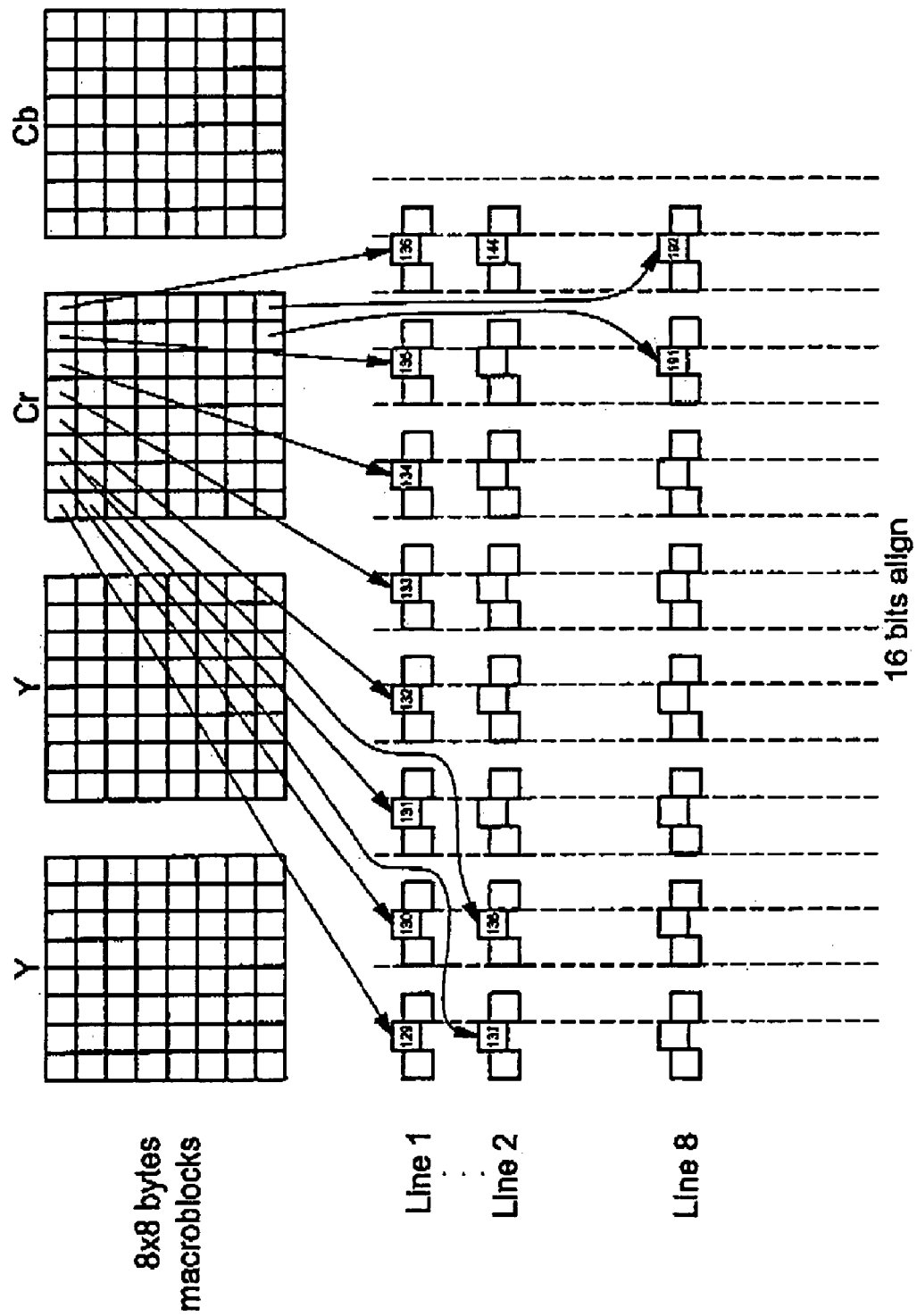

Whereas the 64 bytes of the first Y macroblock are written in the 64 locations of the intermediate memory numbered 1-64 in FIG. 4, the 64 bytes of the second Y macroblock are written in the 64 locations of the intermediate memory numbered 65-128 in FIG. 5. Then, the 64 bytes of the Cr macroblock are interleaved with the 64 bytes of the first macroblock and are written in the 64 locations of the intermediate memory numbered 129-192. Finally, the 64 bytes of the Cb macroblock are interleaved with the 64 bytes of the second Y macroblock and are respectively written at the last 64 locations of the intermediate memory numbered 193-256 in FIG. 7.

Figure 8:
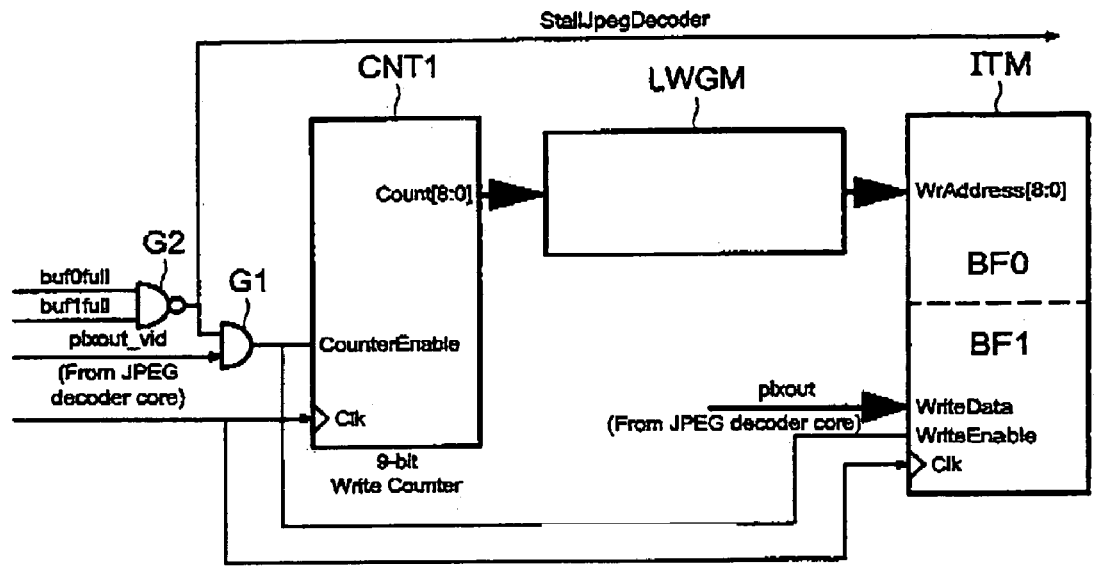
FIGS. 8 and 9 are schematic diagrams illustrating an embodiment of a first logic stage of a device according to the invention.

An embodiment of a first logic stage LST1 which will write the received data into the intermediate memory to obtain the successive raster blocks of FIG. 7 will be now described by reference to FIGS. 8 and 9. The first logic state LST1, fully hardwired, comprises a 9-bit write counter CNT1 clocked byte by byte by a clock signal CLK. The CounterEnable is checked by the output of an AND gate G1 receiving a validation signal from the JPEG decoder, and receiving the output of a NAND gate G2.

The two inputs of the NAND gate G2 are two logic control signals buff0full and buff1full indicating whether or not the two buffers BF0 and BF1 forming the intermediate memory ITM are full. If so, because for example the JPEG decoder is working faster than the conversion device, it is not possible to write into the intermediate memory. Consequently, the counter CNT1 is blocked and a StallJpegDecoder signal is sent to the JPEG decoder to stall the JPEG decoder.

The counter CNT1 delivers a write control word of 9 bits called count[8:0]. And, logic write address generator LWGM is controlled by the successive values of the write control word count[8:0] and generates a write address word of 9 bits, named WRAddress [8:0], the value thereof representing the write address of a current byte to be written in one of the two buffers BF0 and BF1. As illustrated in FIG. 9, bit 7 of the write control word defines the bit 0 of the write address word, whereas bits 3-5 of the write control word define bits 5-7 of the write address word and bit 8 of the write control word defines bit 8 of the write address word.

Further, the logic write address generator LWGM comprises 4 multiplexers MUX0-MUX3 controlled by bit 7 of the write control word. Input 0 of the multiplexer MUX0 and input 1 of the multiplexer MUX1 receive the bit 0 of the write control word. Input 0 of multiplexer MUX1 and input 1 of multiplexer MUX2 receive bit 1 of the write control word. Input 0 of the multiplexer MUX2 and input 1 of the multiplexer MUX3 receive bit 2 of the write control word. Input 0 of the multiplexer MUX3 receives bit 6 of the write control word.

Further, although it is not compulsory, it is necessary in some applications to perform a swapping between the macroblock Cb and the macroblock Cr. Thus, another logic signal called "SwapCbCr" indicates whether or not a swapping is to be made. And, a XOR gate receives respectively bit 6 of the write control word and the additional logic signal SwapCbCr. The output of this XOR gate is connected to input 1 of the multiplexer MUX0. Bits 1, 2, 3 and 4 of the write address word are respectively equal to the output of the multiplexers MUX0-MUX3.

Figure 9:
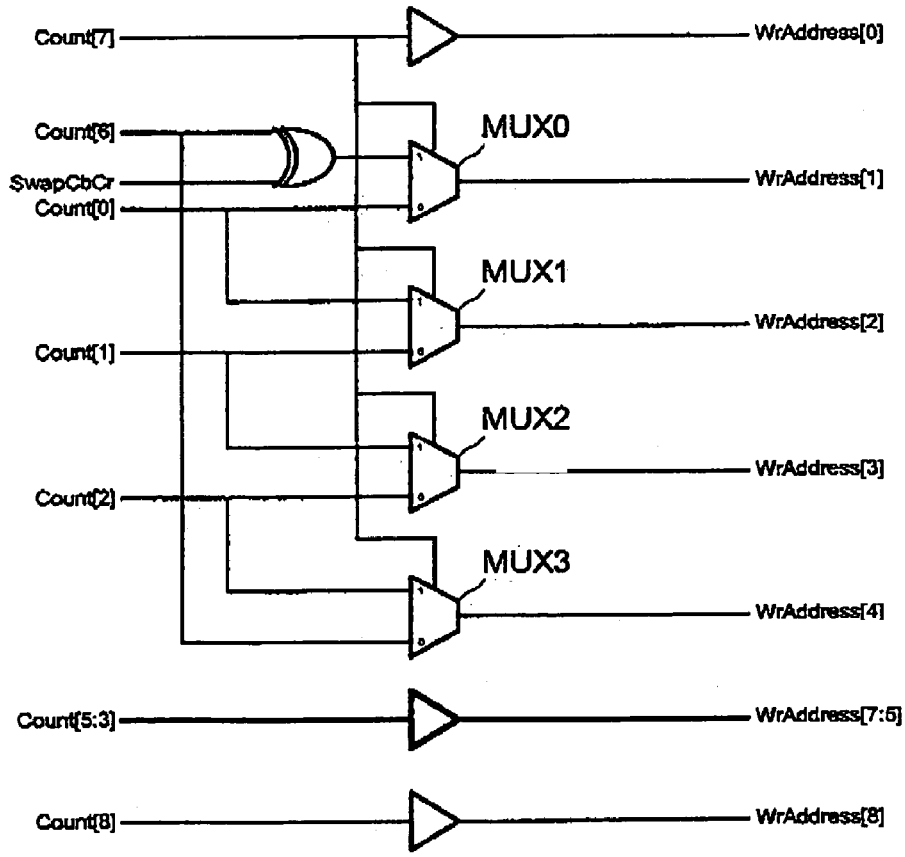

The operation of the first logic stage LST1, and in particular of the logic write address generation means LWGM, and the computation of the successive addresses, is illustrated in FIGS. 10-13, in combination with FIG. 9. Generally, count[2, 1, 0] allow to determine the byte order inside the line. Count [5,4,3] allow to determine the line number inside a macroblock. Count[7] allows to determine which pair of blocks is processed. For example, when this bit is equal to 0, it corresponds to the pairs of Y macroblocks whereas it corresponds to the pairs of chrominance macroblocks when equal to 1. Count[6] allows to distinguish one macroblock inside a pair of macroblocks. At last, count[8] distinguishes one intermediate buffer from the other one. More precisely, for example, when equal to 0, the bytes are written into the buffer BF0. When equal to 1, the bytes are written into the buffer BF1.

FIG. 10 represents the different values of the counter CNT1 as well as the corresponding write addresses for the first macroblock Y of a group of 4 macroblocks. In FIG. 10 as well as in FIGS. 11, 12 and 13, the different values are represented in the decimal notation. For the first macroblock Y:
 Count[6]=count[7]=count[8]=0.
 WrAddress[0]=count[7]=0.
 WrAddress[3,2,1]=count[2,1,0].
 WrAddress[4]=count[6]=0.
 WrAddress[7,6,5]=count[5,4,3].

The processing of the second macroblock Y is illustrated in FIG. 11.
For this macroblock Y:
 WrAddress[0]=count[7]=0.
 WrAddress[3,2,1]=count[2,1,0].
 WrAddress[4]=count[6]=1.
 WrAddress[7,6,5]=count[5,4,3].

FIG. 12 illustrates the processing of the macroblock Cr.
For this macroblock:
 WrAddress[0]=count[7]=1.
 WrAddress[4,3,2]=count[2,1,0].
 WrAddress[1]=count[6]=0.
 WrAddress[7,6,5]=count[5,4,3,].

FIG. 13 illustrates the processing of a macroblock Cb.
For this macroblock:
 WrAddress[0]=count[7]=1.
 WrAddress[4,3,2]=count[2,1,0].
 WrAddress[1]=count[6]=1.
 WrAddress[7,6,5]=count[5,4,3].

Figure 14:
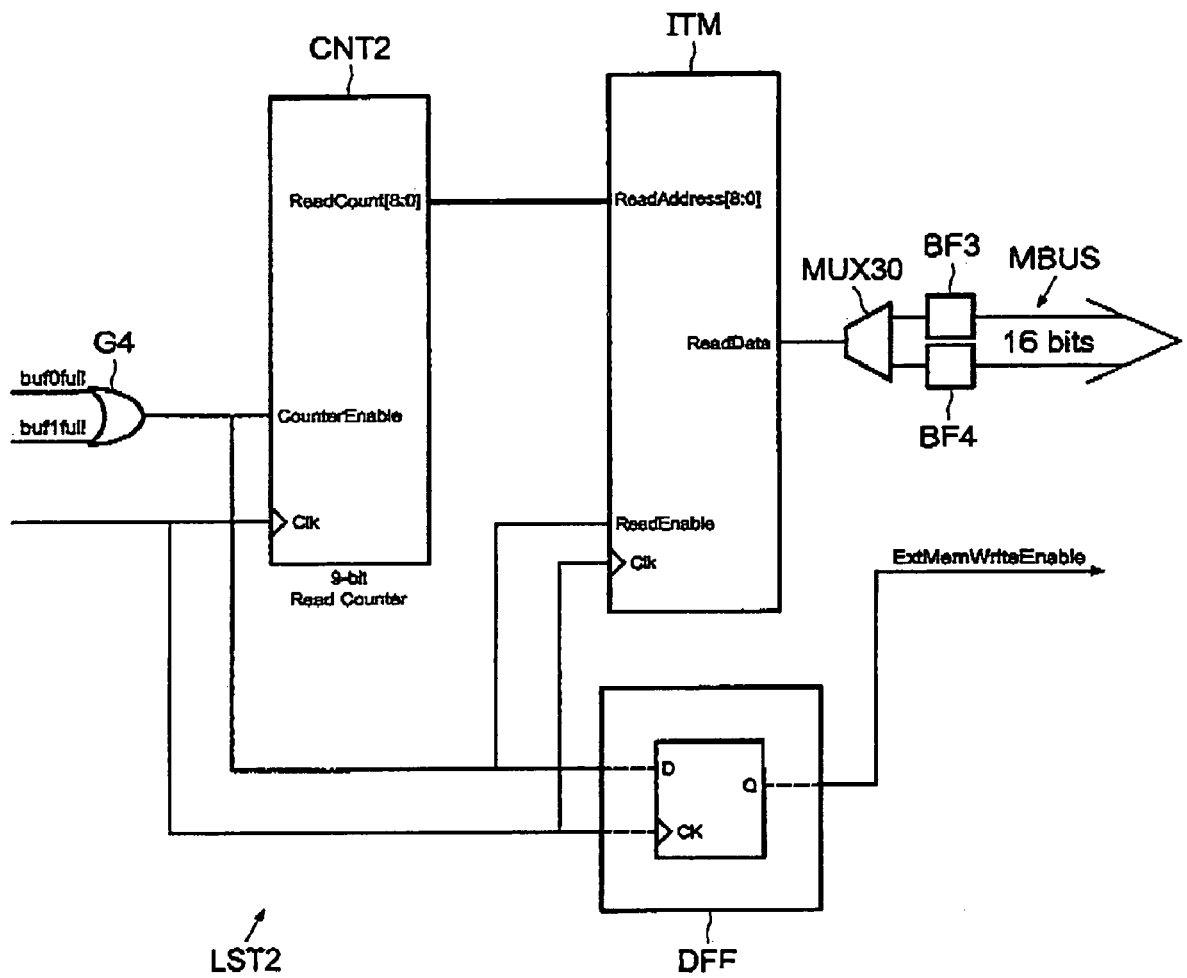
FIG. 14 is a schematic diagram illustrating an embodiment of a second logic stage according to the invention.

At the end of this processing, the 4 macroblocks of the current group have been written, for example in buffer BF0. The following group of 4 macroblocks will be then written in the other buffer BF1 (modification of the value of count[8]), whereas the content of the buffer BF0 will be read by the second logic stage LST2 illustrated in FIG. 14.

The second logic stage LST2 comprises a reader for reading byte by byte at consecutive addresses, the data written in the intermediate memory, i.e. here alternatively the data written in the intermediate buffer BF0 and the data written in the intermediate buffer BF1. The reader comprises a 9-bit Read-Counter CNT2 clocked byte by byte and delivering a read control word called "ReadCount[8:0]". Each value of the read control word represents a read address for the intermediate memory ITM.

Two auxiliary buffers BF3 and BF4, having respectively a size of 8 bits, are connected, through a multiplexer MUX30 to the data output of the intermediate memory ITM. These two auxiliary buffers BF3 and BF4 are used to form the successive packets of 16 bits which will be delivered on the memory bus MBUS having here a size of 16 bits. The packets correspond here to the pixels because the bandwidth of the image memory is equal to 16 bits. More precisely, a first byte is extracted from the intermediate memory ITM and stored in the auxiliary buffer BF3. The following byte is stored in the auxiliary buffer BF4. Then, both bytes forming a packet of 16 bits, are simultaneously delivered on the bus MBUS to the image memory MM. Further, flip flop controller DFF is used for synchronizing a packet on the bus MBUS with the Ext-MemWriteEnable signal of the image memory. The second logic stage LST2 can read the intermediate memory if one of the two buffers is full. That is the reason why an OR gate G4 receiving both logic signals buf0full and buf1full, controls the Counter Enable input of the counter CNT2.

Figure 15:
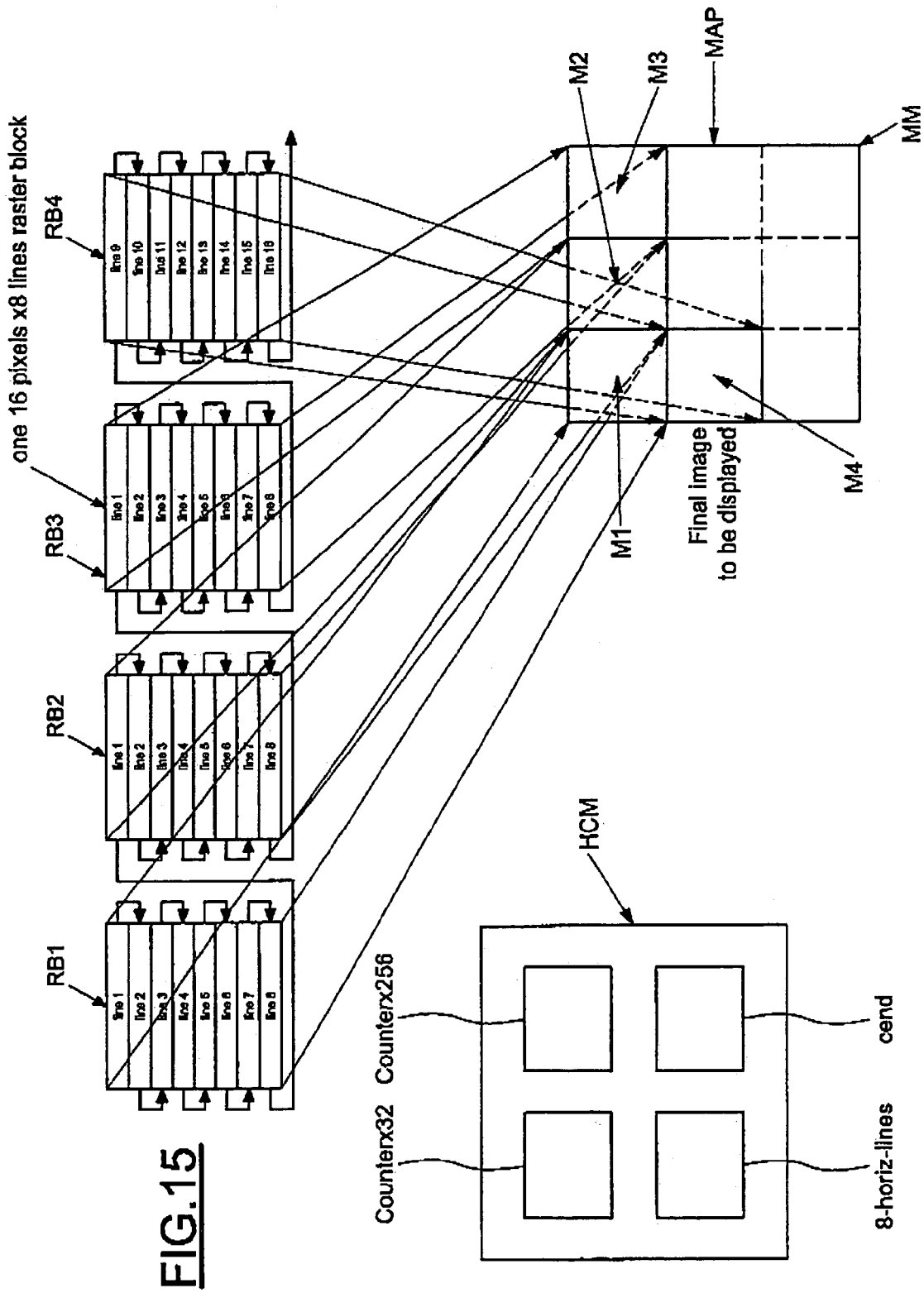
FIG. 15 is a schematic diagram illustrating an embodiment of reconstruction of the final image to be displayed from the data written in the intermediate memory of the device according to the invention.

The final image to be displayed will be reconstructed in the image memory MM. The successive packets (or pixels) of 16 bits will be successively written in the image memory MM at addresses pointed by a memory address pointer MAP controlled by a hardwired controller HCM (FIG. 15). More precisely, in this example, the hardwired controller HCM comprises a first counter, called "Counterx32" associated to the bytes of a line of a raster block, a second counter, called "Counterx256", associated to the lines of a raster block, a third counter, called "8-horiz-lines", associated to the raster blocks of an horizontal part of the image, i.e. to the horizontal size of the image, and a fourth counter, called "cend", associated to the size of the image.

Figure 16:
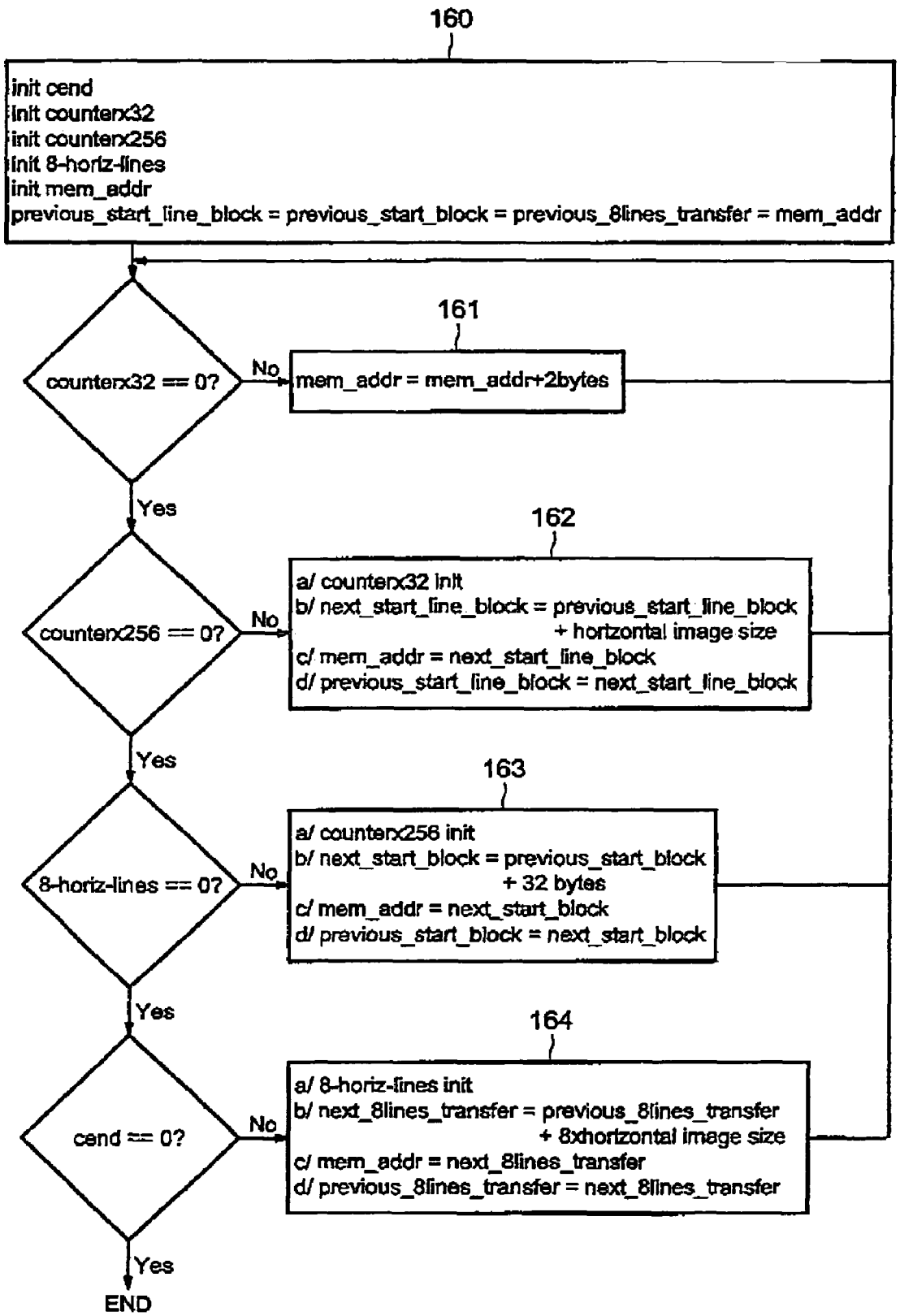
FIG. 16 is a flowchart illustrating the reconstruction steps associated with FIG. 15.

The hardwired controller HCM works according to the process illustrated in FIG. 16. From this process, converted into a specific language for example VHDL, the skilled artisan can implement the hardwired controller HCM, by using for example logic synthesis tools, and obtain a logic realization of the controller HCM comprising counters, logic gates and logic circuits. The 4 counters are clocked byte by byte and are decremented in the present example.

The hardwired controller HCM comprise also several registers for storing several variables like the current address of a packet (pixel) of 16 bits at which this packet must be stored in the image memory. This current address is called "mem_addr". Further, other variables are called respectively:
"previous_start_line_block",
"previous_start_block",
"previous_8lines_transfer".

In step 160 (FIG. 16), the 4 counters are initialized to their respective initial values. More precisely, counterx32 is initialized to 31. Counterx256 is initialized to 255. 8-horiz-lines is initialized in the present case to (256×3−1) because each line of the image has an horizontal size of 3 raster blocks. Finally, counter "cend" is initialized to the total numbers of bytes −1 of the image to be displayed. Mem_addr is initialized to 0 as well as all the other variables.

Then, as long as counterx32 has not reached the final value 0, mem_addr is incremented with a value corresponding to two bytes every two clock cycles (because the packets are formed here with two bytes), for example each time counterx32 is even (step 161). When counterx32 has reached its final value, the first line of the first raster block RB1 is stored at the top of the part M1 of the image memory MM (FIG. 15).

Because counterx256 has not yet reached its final value, the different operations of step 162 are then successively performed. More precisely, counterx32 is initialized to an initial value. Next_start_line_block is equal to previous_start_line_block incremented with the horizontal image size (i.e. the number of raster blocks in a line of the final image). Mem_addr is set to next_start_line_block. Previous_start_line_block is set to next_start_line_block. Then, step 161 is executed again until counterx32 has reached its final value.

When counterx32 has reached its final value, line 2 of raster block RB1 is stored in part M1 of the image memory MM under line 1 of raster block RB1. Step 162 and step 161 are executed as long as counterx256 has not reached its final value. When counterx256 has reached its final value, the raster block RB1 is stored in part M1 of the image memory MM.

Because in the present example, the horizontal size of the image is equal to 3 raster blocks, the counter 8-horiz-lines has not reached its final value when the first raster block RB1 has been stored in the image memory MM. Thus, the several operations included in step 163 are executed. More precisely, counterx256 is initialized again to its initial value. Next_start_block is equal to previous_start_block incremented with a value corresponding to 32 bytes (corresponding to the horizontal size of a raster block). Mem_addr is set to next_start_block and previous_start_block is set to next_start_block. Steps 161 and 162 are executed again to store the second raster block RB2 in the part M2 of the image memory MM.

Then, step 163 is executed, followed again by steps 161 and 162 to store the third raster block RB3 in part M3 of the image memory MM. At this stage, the first eight lines of the final image have been reconstructed in the image memory MM. Because the fourth counter "cend" has not reached its final value, the several operations of step 164 are executed. More precisely, the counter 8-horiz-lines is initialized again to its initial value. Next_8lines_transfer is equal to previous_8lines_transfer incremented with a value corresponding to 8 times the horizontal image size. Mem_address is set to next_8lines_transfer and previous_8lines_transfer is set to next_8lines_transfer. Steps 161 and 162 are again executed to store the fourth raster block RB4 to the part M4 of the image memory. The whole process is executed until the whole image has been reconstructed in the image memory MM.

The above examples have been described with a bandwidth of 16 bits. Of course, if the bandwidth is for example equal to 32 bits, the packets will be formed of four bytes (i.e. 2 pixels) and mem_address will be incremented of a value corresponding to 4 bytes every four clock cycle. Using an intermediate memory for storing the bytes in a display format permits easily to form later the packets to be delivered in the image memory, whatever the size of the packets, and to match with the memory data bus MBUS.

That which is claimed is:

1. A conversion device for performing a raster scan conversion between a JPEG decoder and an image memory, the bandwidth of the image memory being greater than one byte, the conversion device comprising:
   an input for receiving data corresponding to an image to be displayed, said received data being in a JPEG decoder output data format; and
   a processor for reconstructing and writing the image to be displayed into the image memory, in a display module expected input data format, the processor comprising
   an intermediate memory,
   a first logic stage for writing the received data byte by byte into the intermediate memory at chosen addresses such that the written data form a sequence of data in the display module expected input data format, and
   a second logic stage for reading the written data in the intermediate memory, forming successive packets of read data having a size corresponding to the bandwidth, and successively writing the packets into the image memory at chosen addresses such that the written packets together form all the lines of the image.

2. The device according to claim 1, wherein the received data comprises successive groups of a predetermined size, said intermediate memory comprises two intermediate buffers adapted for respectively storing two consecutive groups, and said first logic stage is adapted for writing a current group alternately into one buffer while said second logic stage is adapted to read alternately the other buffer.

3. The device according to claim 1, wherein the received data comprises successive groups of four macroblocks, each macroblock having eight lines of eight bytes, each group corresponding to at least a part of eight lines of an image to be displayed and comprising two 8×8 bytes luminance macroblocks followed by two 8×8 bytes chrominance macroblocks, the data written in said intermediate memory and corresponding to the four macroblocks of one group form a raster block having eight lines, each line of the raster block comprising a first sequence including the eight bytes of the corresponding line of the first luminance macroblock interleaved with the eight bytes of the corresponding line of one chrominance macroblock, followed by a second sequence including the eight bytes of the corresponding line of the second luminance macroblock interleaved with the eight bytes of the corresponding line of the other chrominance macroblock, and all the consecutive bytes of each consecutive line of the raster block are written at consecutive addresses of said intermediate memory.

4. The device according to claim 3, wherein said first logic stage comprises a 9-bit write counter clocked byte by byte and delivering a write control word of nine bits, and a logic write address generator controlled by the successive values of the write control word.

5. The device according to claim 4, wherein the first three bits of the write control word are representative of a byte order inside a line of a macroblock, the three following bits of the write control word are representative of a line order inside one macroblock, the $8^{th}$ bit distinguishes within a group of four macroblocks a pair of luminance macroblocks from a pair of chrominance macroblocks, the $7^{th}$ bit distinguishes one macroblock inside a pair of macroblocks, and the last bit of the write control word distinguishes one intermediate buffer from the other one.

6. The device according to claim 3, wherein said second logic stage comprises a reader for reading byte by byte the written data in said intermediate memory at consecutive addresses, and n auxiliary buffers connected to the output of said intermediate memory for storing n consecutive read bytes and forming the corresponding packet having a size corresponding to the bandwidth.

7. The device according to claim 6, wherein said reader comprises a 9-bit read counter clocked byte by byte and delivering a read control word, and each value of the read control word represents a read address for said intermediate memory.

8. The device according to claim 6, wherein said second logic stage comprises a memory address pointer controlled by a controller comprising a first counter associated to the bytes of a line of a raster block, a second counter associated to the lines of a raster block, a third counter associated to the raster blocks of a horizontal part of the image, and a fourth counter associated to the size of the image, all the counters are clocked byte by byte, and the memory address pointer is incremented by a number of bytes corresponding to the bandwidth each time the difference between a current value and the preceding value of a counter is equal to the number.

9. A conversion device for performing a raster scan conversion between an image decoder and an image memory, the conversion device comprising:
   an input for receiving data corresponding to an image to be displayed, said received data being in a first data format defined by the image decoder output; and
   a processor for reconstructing and writing the image to be displayed into the image memory, in a second data format defined by the display module expected input, the processor comprising
      an intermediate memory,
      a first logic stage for writing the received data into the intermediate memory so that the written data form a sequence of data in the second data format, and
      a second logic stage for reading the written data in the intermediate memory, forming successive packets of read data, and successively writing the packets into the image memory so that the written packets together form the image.

10. The device according to claim 9, wherein the received data comprises successive groups of a predetermined size, said intermediate memory comprises two intermediate buffers adapted for respectively storing two consecutive groups, and said first logic stage is adapted for writing a current group into one buffer while said second logic stage is adapted to read the other buffer.

11. The device according to claim 9, wherein the received data comprises successive groups of four macroblocks, each macroblock having eight lines of eight bytes, each group corresponding to at least a part of eight lines of an image to be displayed and comprising two 8×8 bytes luminance macroblocks followed by two 8×8 bytes chrominance macroblocks, the data written in said intermediate memory and corresponding to the four macroblocks of one group form a raster block having eight lines, each line of the raster block comprising a first sequence including the eight bytes of the corresponding line of the first luminance macroblock interleaved with the eight bytes of the corresponding line of one chrominance macroblock, followed by a second sequence including the eight bytes of the corresponding line of the second luminance macroblock interleaved with the eight bytes of the corresponding line of the other chrominance macroblock, and all the consecutive bytes of each consecutive line of the raster block are written at consecutive addresses of said intermediate memory.

12. The device according to claim 9, wherein said first logic stage comprises a write counter delivering a write control word, and a logic write address generator controlled by the write control word.

13. The device according to claim 11, wherein said second logic stage comprises a reader for reading the written data in said intermediate memory at consecutive addresses, and n auxiliary buffers connected to an output of said intermediate memory for storing n consecutive read bytes and forming the corresponding packet.

14. The device according to claim 13, wherein said reader comprises a read counter delivering a read control word, and each value of the read control word represents a read address for said intermediate memory.

15. The device according to claim 13, wherein said second logic stage comprises a memory address pointer controlled by a controller comprising a first counter associated to the bytes of a line of a raster block, a second counter associated to the lines of a raster block, a third counter associated to the raster blocks of a horizontal part of the image, and a fourth counter associated to the size of the image, and the memory address pointer is incremented by based upon the difference between a current value and the preceding value of a counter.

16. A Digital Still Camera (DSC) comprising:
   a JPEG decoder;
   an image memory having a bandwidth greater than one byte;
   a conversion device for performing a raster scan conversion between the JPEG decoder and the image memory, the conversion device comprising
      an input for receiving data corresponding to an image to be displayed, said received data being in a JPEG decoder output data format; and
      a processor for reconstructing and writing the image to be displayed into the image memory, in a display module expected input data format, the processor comprising
         an intermediate memory,
         a first logic stage for writing the received data byte by byte into the intermediate memory at chosen addresses such that the written data form a sequence of data in the display module expected input data format, and
         a second logic stage for reading the written data in the intermediate memory, forming successive packets of read data having a size corresponding to the bandwidth, and successively writing the packets into the image memory at chosen addresses such that the written packets together form all the lines of the image.

17. The DSC according to claim 16, wherein the received data comprises successive groups of a predetermined size, said intermediate memory comprises two intermediate buffers adapted for respectively storing two consecutive groups, and said first logic stage is adapted for writing a current group into one buffer while said second logic stage is adapted to read the other buffer.

18. The DSC according to claim 16, wherein the received data comprises successive groups of four macroblocks, each macroblock having eight lines of eight bytes, each group corresponding to at least a part of eight lines of an image to be displayed and comprising two 8×8 bytes luminance macroblocks followed by two 8×8 bytes chrominance macroblocks, the data written in said intermediate memory and corresponding to the four macroblocks of one group form a raster block having eight lines, each line of the raster block comprising a first sequence including the eight bytes of the corresponding line of the first luminance macroblock interleaved with the eight bytes of the corresponding line of one chrominance macroblock, followed by a second sequence including the eight bytes of the corresponding line of the second luminance macroblock interleaved with the eight bytes of the corresponding line of the other chrominance macroblock, and all the consecutive bytes of each consecutive line of the raster block are written at consecutive addresses of said intermediate memory.

19. A method for performing a raster scan conversion between an image decoder and an image memory, the method comprising:

receiving data corresponding to an image to be displayed, said received data being in a first data format defined by the image decoder output; and reconstructing and writing the image to be displayed into the image memory, with a processor, in a second data format defined by the display module expected input, the processor comprising an intermediate memory, a first logic stage for writing the received data into the intermediate memory so that the written data form a sequence of data in the second data format, and a second logic stage for reading the written data in the intermediate memory, forming successive packets of read data, and successively writing the packets into the image memory so that the written packets together form the image.

20. The method according to claim 19, wherein the received data comprises successive groups of a predetermined size, the intermediate memory comprises two intermediate buffers adapted for respectively storing two consecutive groups, and the first logic stage is adapted for writing a current group into one buffer while the second logic stage is adapted to read the other buffer.

21. The method according to claim 19, wherein the received data comprises successive groups of four macroblocks, each macroblock having eight lines of eight bytes, each group corresponding to at least a part of eight lines of an image to be displayed and comprising two 8×8 bytes luminance macroblocks followed by two 8×8 bytes chrominance macroblocks, the data written in said intermediate memory and corresponding to the four macroblocks of one group form a raster block having eight lines, each line of the raster block comprising a first sequence including the eight bytes of the corresponding line of the first luminance macroblock interleaved with the eight bytes of the corresponding line of one chrominance macroblock, followed by a second sequence including the eight bytes of the corresponding line of the second luminance macroblock interleaved with the eight bytes of the corresponding line of the other chrominance macroblock, and all the consecutive bytes of each consecutive line of the raster block are written at consecutive addresses of said intermediate memory.

* * * * *

UNITED STATES PATENT AND TRADEMARK OFFICE
CERTIFICATE OF CORRECTION

| | | |
|---|---|---|
| PATENT NO. | : 7,460,718 B2 | Page 1 of 2 |
| APPLICATION NO. | : 11/155391 | |
| DATED | : December 2, 2008 | |
| INVENTOR(S) | : Gautier et al. | |

It is certified that error appears in the above-identified patent and that said Letters Patent is hereby corrected as shown below:

Title Page, Item 57, Abstract

Delete: "The conversion device includes an input for receiving data corresponding to an image to be displayed. The received data is in a JPEG decoder output data format A processor is included for reconstructing and writing the image to be displayed into the image memory, in a display module expected input data format. The bandwidth of the image memory is greater than one byte. The processor is fully hardwired and includes a first logic stage for writing the received data byte by byte into an intermediate memory at chosen addresses such that the written data form a sequence of data in the display module expected input data format, and a second logic stage for reading the written data in the intermediate memory, forming successive packets of read data having a size corresponding to the bandwidth, and successively writing the packets into the image memory at chosen addresses such that the written packets together form all the lines of the image."

Insert: -- The conversion device includes an input for receiving data corresponding to an image to be displayed. The received data is in a JPEG decoder output data format. A processor is included for reconstructing and writing the image to be displayed into the image memory, in a display module expected input data format. The bandwidth of the image memory is greater than one byte. The processor is fully hardwired and includes a first logic stage for writing the received data byte by byte into an intermediate memory at chosen addresses such that the written data Signed and Sealed this
Fifteenth Day of May, 2012

David J. Kappos
*Director of the United States Patent and Trademark Office*

CERTIFICATE OF CORRECTION (continued)
U.S. Pat. No. 7,460,718 B2

| | |
|---|---|
| Title Page, Item 57, Abstract | form a sequence of data in the display module expected input data format, and a second logic stage for reading the written data in the intermediate memory, forming successive packets of read data having a size corresponding to the bandwidth, and successively writing the packets into the image memory at chosen addresses such that the written packets together form all the lines of the image.-- |
| Column 2, Line 13 | Delete: "the another" <br> Insert: --another-- |
| Column 2, Line 56 | Delete: "sponding the" <br> Insert: --sponding to the-- |
| Column 3, Line 1 | Delete: "of a raster" <br> Insert: --of the raster-- |
| Column 3, Line 32 | Delete: "ofwriting" <br> Insert: --of writing-- |
| Column 3, Line 33 | Delete: "address" <br> Insert: --addresses-- |